(12) United States Patent
Stenzel et al.

(10) Patent No.: US 6,558,737 B1
(45) Date of Patent: May 6, 2003

(54) METHOD FOR PRODUCING AN ELECTRODE, AND FOR PRODUCING A CAPACITOR WITH THE ELECTRODE

(75) Inventors: Melanie Stenzel, Demmingen (DE); Holger Zillgen, Nattheim (DE); Janos Giber, Budapest (HU)

(73) Assignee: EPCOS AG, Munich (DE)

( * ) Notice: Subject to any disclaimer, the term of this patent is extended or adjusted under 35 U.S.C. 154(b) by 309 days.

(21) Appl. No.: 09/724,579

(22) Filed: Nov. 28, 2000

(30) Foreign Application Priority Data

Sep. 8, 2000 (DE) .......................... 100 44 450

(51) Int. Cl.[7] .......................... B05D 5/12; H01R 43/16; H07G 9/00
(52) U.S. Cl. ................... 427/79; 427/126.1; 427/372.2; 29/874; 29/25.03; 29/25.41
(58) Field of Search ..................... 427/79, 80, 126.1, 427/372.2; 29/874, 25.03, 25.41

(56) References Cited

U.S. PATENT DOCUMENTS

| | | | |
|---|---|---|---|
| 3,597,664 A | | 8/1971 | Villani |
| 3,867,129 A | | 2/1975 | Ronneau et al. |
| 3,972,059 A | * | 7/1976 | DiStefano ................ 257/30 |
| 3,984,208 A | | 10/1976 | Moulin et al. |
| 5,146,169 A | * | 9/1992 | Morishita et al. ......... 324/438 |
| 6,103,400 A | * | 8/2000 | Yamada et al. ............ 428/627 |

FOREIGN PATENT DOCUMENTS

DE 44 08 579 A1 9/1995

* cited by examiner

*Primary Examiner*—Brian K. Talbot
(74) *Attorney, Agent, or Firm*—Bell, Boyd, & Lloyd LLC

(57) ABSTRACT

A method for producing an electrode for a capacitor, particularly an electrolyte capacitor, proceeding from an alloy with a component A and a component B, wherein the surface energy of the component A is greater than the surface energy of the component B and wherein a layer containing the component B arises at the surface of a body containing the component A by oxidation-induced segregation and tempering of the alloy. A method for producing a capacitor with such an electrode is also disclosed. The long-time stability of the electrode or, respectively, of the capacitor can be improved by the production of an intermediate layer which impedes the diffusion of oxygen and which dissolves less oxygen than the electrode body.

11 Claims, 1 Drawing Sheet

METHOD FOR PRODUCING AN ELECTRODE, AND FOR PRODUCING A CAPACITOR WITH THE ELECTRODE

BACKGROUND OF THE INVENTION

1. Field of the Invention

The present invention relates to a method for producing an electrode for a capacitor, the capacitor having an electrode charge eliminator and a body contacted therewith, wherein an electrode body having a dielectric layer on its surface is formed by oxidizing a surface layer of the body. Furthermore, the present invention relates to a method for producing the capacitor.

2. Description of the Prior Art

Methods for producing electrodes for capacitors are known wherein, on the basis of a porous sintered body made of niobium, an anodic oxidation is carried out on the surface of the sintered body. A dielectric layer composed of $Nb_2O_5$ thereby forms on the surface of the sintered compact.

The known methods with respect to niobium capacitors have the disadvantage that the capacitors produced therewith do not have sufficient long-time stability. This results from oxygen from the dielectric layer diffusing into the metallic niobium of the sintered compact, so that suboxides exhibiting semiconducting ($NbO_2$) or, respectively, electrically conducting ($NbO$) properties are formed in the oxide layer as a result thereof. As such, the dielectric becomes effectively thinner, such that electric strength is lost and the capacitor fails.

Therefore, the present invention is directed to providing a method for producing an electrode for capacitors which has a high long-time stability.

SUMMARY OF THE INVENTION

Accordingly, the present invention proposes a method enabling the production of an electrode with an electrode body, of an electrode charge eliminator contacted therewith, of a dielectric layer on the surface of the electrode body and of an immediate layer between the dielectric layer and the electrode body.

Pursuant to the inventive method, an electrode charge eliminator and a body contacted therewith are taken as a basis—the body being made of a material with a component A and a component B. The components are selected such that the component A is a conductive material whose surface can be transformed into a dielectric by oxidation. Furthermore, the components are selected such that the absolute amount of the free enthalpy $\Delta G$ of the oxidation is greater with respect to the component A than with respect to the component B. As a result, the component A is preferably oxidized at the surface. Finally, the surface energy of the component A must be greater than the surface energy of the component B, this being a secondary condition.

On the basis of the described material compound, the following steps are carried out:

a) the component A of the material is oxidized in a surface layer of the body, so that an electrode body having a dielectric layer on its surface is formed; and b) subsequently, the electrode body is treated with heat at a suitable temperature until the component B of the material segregates at the surface of the electrode body—there, the component B forms an intermediate layer between the electrode body and the dielectric layer.

Furthermore, the present invention proposes a method for manufacturing a capacitor which includes the following steps:

c) covering the surface of the pores of the electrode with a counter electrode; and d) contacting the counter electrode with a counter electrode charge eliminator.

Due to a suitable selection of the component B, the intermediate layer of the inventive electrode can be functionally formed such that it stops the exchange of matter between the dielectric layer and the electrode body.

The inventive method has the advantage that the material, of which the intermediate layer is formed, is present as the component of the body material. Thus, the material of the intermediate layer can be very easily introduced into the method; for example, in the form of a homogenous alloy.

The energetic requirements for forming the oxides of the components A and B are met, for example, by niobium as the component A and by vanadium as the component B. Given niobium ($Nb_2O_5$), the free enthalpy $\Delta$ of the oxidation is $\Delta G_{ox}=-210.5$ kcal/mol. The free enthalpy of the oxidization of vanadium is ($V_2O_5$) $\Delta G_{ox}=-135.7$ kcal/mol. This means, in the case of an oxidization caused by an anodic oxidization, for example, that $Nb_2O_5$ will preferably form and not $V_2O_5$. It is therefore assured that the dielectric layer of the electrode, by an oxidation-induced segregation, is preferably formed of the material of the component A, which is suitable therefor.

If niobium is selected as the component A and vanadium as the component B, the correct ratio of sizes is received for the respective surface energies. The surface energy of niobium is $\gamma=2.983$ $Jm^{-2}$, whereas the surface energy of vanadium is $\gamma=2.876$ $Jm^{-2}$. It is thereby achieved that the component B having the weaker surface energy enriches itself by segregation at the surface of the electrode body, namely between the dielectric layer and the electrode body, as a result of the heat treatment carried out after the oxidization.

Therefore, the inventive method has the advantage that the component B, by the very simple heat treatment and without additional measures, can be transported to the desired location; namely, between the surface of the electrode body and the dielectric layer.

In an advantageous embodiment of the method of the present invention, the component B can be selected such that the intermediate layer formed by it blocks the exchange of oxygen between the dielectric layer and the electrode body. For this purpose, it is necessary that the diffusion rate of oxygen in the component B is lower than in the component A and that the oxygen in the component B does not dissolve as well as in the component A. This condition is fulfilled in that niobium is selected as the component A and vanadium as the component B. As a result of such an intermediate layer blocking the diffusion of oxygen, the forming of suboxides by depletion of oxygen in the dielectric layer composed of $Nb_2O_5$ can be effectively prevented.

As a material for the inventive method, a metallic alloy can be advantageously utilized, wherein the portion of the component B typically is between 10 and 50 weight percent—ppm. Given the utilization of niobium as component A and vanadium as component B, it is particularly simple in terms of production to provide the mixture in the form of an alloy, since metals are used in both cases. The component B also can be present in the form of a dopant in the material.

Moreover, a valve metal such as niobium or tantalum, or also a valve-metalliferous alloy such as a niobium/tantalum alloy, also can be utilized given the material of the body for the component A. In the case of the component A representing a niobium/tantalum alloy, a mixed oxide with particularly advantageous properties would be received for the dielectric layer.

Preferably, the body used in the method can be a porous body which is produced by sintering a powder or paste, for example. The utilization of a porous body as an electrode body has the advantage of a large surface, so that the capacitor produced with the electrode has a high capacitance.

For purposes of reducing the oxygen diffusion between the dielectric layer and the electrode body, a component B containing scandium, yttrium, a lanthanide, titanium, zirconium vanadium, chromium, wolfram (Tungsten) or molybdenum is particularly considered. Lanthanides such as lanthanum, cerium, praseodymium, neodymium, polonium, samarium, europium, gadolinium, terbium, dysprosium, holmium, erbium, ytterbium or lutetium also can be considered.

It is also particularly advantageous to select the portion of the component B with respect to the material of the body, as well as the duration and temperature of the heat treatment for the electrode body, such that an intermediate layer having a thickness of at least two atomic monolayers arises. The production conditions for the anode body, for example by extending the heating duration or by increasing the heating temperature, also can be selected such that a thicker intermediate layer arises. For example, in the case of niobium (component A) and vanadium (component B), such an intermediate layer can be achieved by a portion of the component B of 1% with respect to the alloy and with a heating duration of typically 0.5 to 3 hours and a heating temperature up to 450° C.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
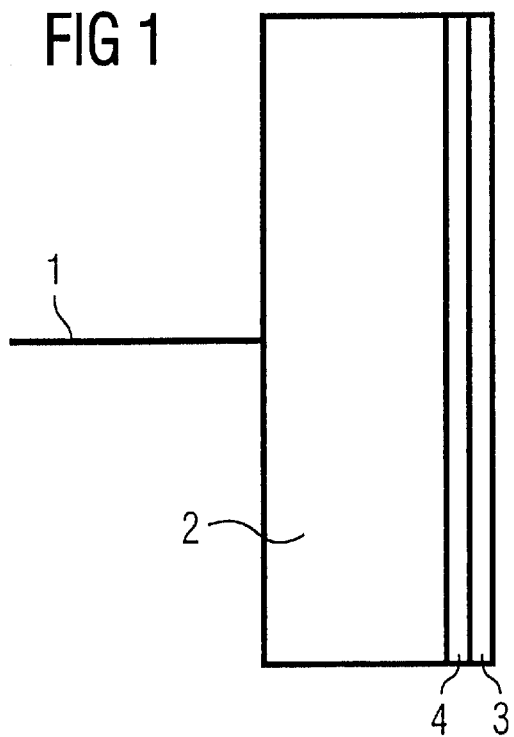
FIG. 1 shows a schematic cross-sectional view of an exemplary electrode of the present invention.

FIG. 1 shows an electrode with an electrode body 2, which is connected to an electrode charge eliminator 1 in an electrically-conducting manner. A dielectric layer 3 is arranged on the surface of the electrode body 2. An intermediate layer 4 is arranged between the electrode body 2 and the dielectric layer 3.

Figure 2:
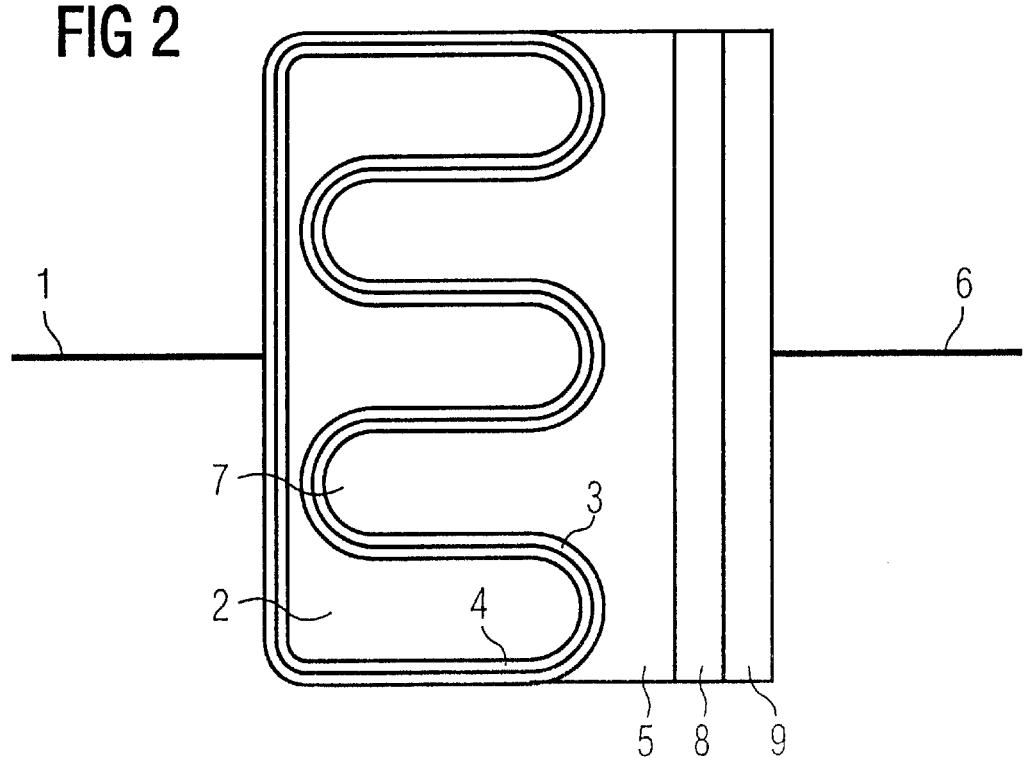
FIG. 2 shows a schematic cross-sectional view of an electrolytic capacitor having the inventive electrode as its anode.

FIG. 2 shows an electrolytic capacitor with the inventive electrode as its anode, wherein the electrode corresponds to the basic structure of FIG. 1 and wherein the electrolytic body 2 of the electrode is a porous body with pores 7. The electrode body 2 preferably includes a valve metal such as tantalum or niobium, wherein a dielectric oxide can be produced therefrom by anodic oxidation.

The electrode body 2 preferably is produced from an alloy of niobium and vanadium in the form of a powder. An electrode charge eliminator 1 in the form of either a metal wire or a planar, metallic charge eliminator is formed thereby. For example, a tantalum-containing wire or a niobium-containing wire or a planar charge eliminator made of a corresponding material is covered by the powder and is subsequently sintered together with it. A porous electrode body 2 that is connected to the electrode charge eliminator 1 results therefrom. The portion of the vanadium with respect to the alloy thereby can be, typically, between 10 and 50 weight percent—ppm. Alternatively, the electrode also can be produced with the aid of a paste which is deposited on the electrode charge eliminator 1 by an appropriate method, such as silk-screen, and which is subsequently sintered.

In a further process step, a dielectric layer of $Nb_2O_5$ can be formed on the surface of the electrode body 2 by anodic oxidization. This layer forms the dielectric layer 3. An electrode composed of niobium is characterized by a high specific charge and by a relative permittivity of the formed dielectric. The aforementioned process step is known to someone skilled in the art as forming and can be carried out, for example, by means of an electrode body 2 immersing into an electrolyte with a phosphoric acidity between typically 0.1 and 5% given a temperature between typically 30 and 85° C. A forming voltage between preferably 10 and 80 V is applied between the electrode charge eliminator 1 and the counter electrode utilized during the forming.

In a further manufacturing step, a part of the vanadium segregates from the alloy to the surface of the electrode body 2 and forms an intermediate layer 4 between the dielectric layer 3 and the electrode body 2 after the oxide has formed through a heat treatment between 250 and 450° C. for a period of time of 0.5 to 3 hours. The segregation is possible due to different surface energies of vanadium and niobium.

The intermediate layer 4 is composed of vanadium, which potentially can still contain impurities. A property of vanadium is that it does not dissolve oxygen as well such that it cannot be diffused as well compared to niobium. Therefore, it is a suitable diffusion barrier for the oxygen outputted in the dielectric layer 3, which is composed of $Nb_2O_5$; otherwise, the oxygen would diffuse into the niobium electrode body 2. The oxide layer, in the course of time, would be transformed into suboxides as a result of this oxygen loss. The inventive electrode produced as such can be completed to a capacitor in a way that is known per se.

The pores 7 of the electrode are filled with a counter electrode material 5, such as $MnO_2$ or a conductive polymer. In further process steps, contact layers 8, 9 are produced which are finally connected to a counter electrode charge eliminator 6. The first contact layer 8 can be manufactured from graphite and the second contact layer 9 can be manufactured from silver conductive lacquer, for example.

Although the present invention has been described with reference to specific embodiments, those of skill in the art will recognize that changes may be made thereto without departing from the spirit and scope of the invention as set forth in the hereafter appended claims.

We claim as our invention:

1. A method for producing an electrode for a capacitor, the method comprising the steps of:
   providing an electrode charge eliminator;
   providing a body that is contacted with the electrode charge eliminator, the body comprised of a component A and a component B, wherein the component A is an electrically conductive material which can be partially transformed into a dielectric by oxidization, an absolute amount of free enthalpy $\Delta G$ of the oxidation is greater with respect to the component A than with respect to the component B, and a surface energy of the component A is greater than a surface energy of the component B;

oxidizing the component A in a surface layer of the body to form an electrode body having a dielectric layer on a surface of the electrode body; and treating the electrode body with heat at a temperature until the component B segregates to the surface of the electrode body and forms an intermediate layer between the electrode body and the dielectric layer.

2. A method for producing an electrode for a capacitor as claimed in claim 1, the method further comprising the step of:

selecting the component B such that the intermediate layer blocks an exchange of matter between the dielectric layer and the electrode body.

3. A method for producing an electrode for a capacitor as claimed in claim 1, the method further comprising the step of:

selecting a metallic alloy as the material of the body, wherein a portion of the component B with respect to the alloy is between 10 and 50 weight percent—ppm.

4. A method for producing an electrode for a capacitor as claimed in claim 3, the method further comprising the steps of:

selecting the component A as one of a valve metal and a valve-metalliferous alloy; and selecting the component B as a metal.

5. A method for producing an electrode for a capacitor as claimed in claim 1, the method further comprising the step of:

providing the electrode with a porous body.

6. A method for producing an electrode for a capacitor as claimed in claim 1, the method further comprising the step of:

selecting the component B such that the intermediate layer blocks diffusion of oxygen between the dielectric layer and the electrode body.

7. A method for producing an electrode for a capacitor as claimed in claim 1, the method further comprising the step of:

selecting the component B such that it contains at least one of scandium, yttrium, a lanthanide, titanium, zirconium, vanadium, chromium, molybdenum, or wolfram.

8. A method for producing an electrode for a capacitor as claimed in claim 1, the method further comprising the steps of:

selecting niobium as the component A wherein the component A oxidizes to $Nb_2O_5$;

selecting vanadium as the component B; and treating the electrode body with heat for 0.5 to 3 hours at a temperature up to 450° C.

9. A method for producing an electrode for a capacitor as claimed in claim 1, the method further comprising the step of:

selecting a portion of the component B with respect to the material of the body, as well as a duration and temperature of the heat treatment of the electrode body, such that the intermediate layer has a thickness of at least two atomic monolayers.

10. A method for producing an electrode for a capacitor as claimed in claim 1, the method further comprising the step of:

selecting the component B to be a dopant in the material of the body.

11. A method for producing a capacitor, the method comprising the steps of:

providing an electrode charge eliminator;

providing a body that is contacted with the electrode charge eliminator, the body comprising a component A and a component B, wherein the component A is an electrically conductive material which can be partially transformed into a dielectric by oxidization, an absolute amount of free enthalpy $\Delta G$ of the oxidation is greater with respect to the component A than with respect to the component B, and a surface energy of the component A is greater than a surface energy of the component B;

oxidizing the component A in a surface layer of the body to form an electrode body having a dielectric layer on a surface of the electrode body, the electrode body being a porous body;

treating the electrode body with heat at a temperature until the component B segregates to the surface of the electrode body and forms an intermediate layer between the electrode body and the dielectric layer;

covering a surface of the pores of the electrode body with a counter electrode; and contacting the counter electrode with a counter electrode charge eliminator.

* * * * *